United States Patent Office 3,764,474
Patented Oct. 9, 1973

3,764,474
MIXED CULTURE OF YEASTS ON HYDROCARBON
Kiyoshi Watanabe and Hiroshi Yano, Takasago, Kenji Suzuki, Kakogawa, Yoshimitsu Mekata, Takasago, and Hajime Kawaharada, Kakogawa, Japan, assignors to Kanegafuchi Kagaku Kogyo Kabushiki Kaisha, Osaka, Japan
No Drawing. Filed July 7, 1970, Ser. No. 53,023
Int. Cl. C12b 1/00
U.S. Cl. 195—28 R      9 Claims

ABSTRACT OF THE DISCLOSURE

Yeast cells having increased protein content are produced with improved assimilating efficiency by cultivating a mixed culture of a hydrocarbon-assimilating yeast such as strains belonging to the genera Torulopsis, Candida, Pichia and Zygosaccharomyces and a hydrocarbon-unassimilating yeast such as strains belonging to the genera Trichosporon, Candida, Rhodotorula, Torulopsis and Debaryomyces, under aerobic conditions in an aqueous nutrient medium containing petroleum hydrocarbons as a carbon source.

---

This invention relates to a process for producing yeast cells by cultivating yeasts in a nurtient containing petroleum hydrocarbons.

More particularly, this invention is directed to such process wherein a mixed culture of a hydrocarbon-assimilating yeast and a hydrocarbon-unassimilating yeast is cultivated under aerobic conditions in a culture medium containing petroleum hydrocarbons. The process obtains more efficient assimilation of petroleum hydrocarbons and, as a result, the production of yeast cells with increased yield of yeast cells and of content of crude protein.

In recent years, considerable attention has been directed to the concept of obtaining protein from petroleum. Various schemes for commercialization of processes for obtaining such proteins have been and are vigorously under way especially in anticipation of a world-wide serious food shortage. At present, however, with known processes commercialization is difficult to attain because of the limitations on raw materials required, production costs, etc. A great unfulfilled need has existed for a cultivating technique employing n-paraffins as a main raw material which could be accomplished economically.

Accordingly, one of the objects of this invention is to economically produce petroleum yeast showing a high content of protein. We extensively worked on a number of yeasts obtained from type cultures and those isolated from nature in an attempt to increase the yield and protein content of the resulting cells. We found that some species of hydrocarbon-assimilating yeasts belonging to the genera of Candida, Zygosaccharomyces and others can be cultivated mixed with some species of hydrocarbon-nonassimilating yeasts belonging to the genera of Trichosporon, Rhodotorula and others in the presence of petroleum hydrocarbons, and that as a result, the yield and the crude protein content of the resulting cells can be substantially increased.

The term "hydrocarbon-assimilating yeasts" is used herein to denote those yeasts which assimilate hydrocarbons. The term "hydrocarbon-nonassimilating yeasts" is used herein to denote those yeasts which do not assimilate hydrocarbons.

Some specific examples of the hydrocarbon-assimilating yeasts used in the present invention are *Torulopsis xylinus*, *Candida novellus*, *Candida tropicalis*, *Candida guilliermondii*, *Candida rugosa*, *Candida parapsilosis*, *Candida lipolytica*, *Pichia miso mogii* and *Zygosaccharomyces tikumaensis*.

*Candida novellus* is described in a copending patent application Ser. No. 53,024 entitled "Process for Fermentative Production of Yeast Cells" and filed concurrently herewith and having the same assignee hereof. The species is designated ATCC 20275 and is free available to the public at the American Type Culture Collection, Rockville, Md. The taxonomic properties thereof are disclosed in said Ser. No. 53,024 which is incorporated herein by reference. The yeasts which are used in the present invention as a hydrocarbon-assimilating yeast are, however not limited to the above-mentioned species. They may include variant or mutant strains thereof as well as any strains isolated from nature which belong to other species.

Specific examples of the hydrocarbon-nonassimilating yeasts used in the present invention are yeasts belonging to family Cryptococcaceae, for example *Trichosporon pullulans*, *Trichosporon cutaneum*, *Candida utilis*, *Rhodotorula rubra*, *Rhodotorula minuta*, *Torulopsis pseudaeria* and yeasts belong to families other than family Cryptococcaceae such as *Debaryomyces hansenii*. Hydrocarbon-nonassimilating yeasts used in the present invention are, however ,not limited to the above-mentioned species. They may include variant or mutant strains thereof as well as any hydrocarbon-nonassimilating yeasts belong to other species.

When any of these hydrocarbon-assimilating yeasts was cultivated, without the addition of hydrocarbon-nonassimilating yeasts, under aerobic condition for 48 hours in a culture medium of the composition indicated in Table 1 below, the degree of assimilation was found to be about from 60% to 95% and the amount of crude protein contained in the resulting cells was found to be about from 35 to 55%. But when the hydrocarbon-assimilating yeast was cultivated mixed with a hydrocarbon-nonassimilating yeast, for example *Trichosporon pullulans* (with an inoculation ratio of 1:1) under aerobic condition for 48 hours in the same culture medium as mentioned above, the degree of assimilation was unexpectedly found to be about 90 to 110% while the crude protein content of the cells was also unexpectedly found to be about from 55% to 65%. In this field of technology these improvements are considered substantial and of great commercial significance.

The term "inoculation ratio" or "mixing ratio," as used herein refers to the ratio of hydrocarbon-assimilating yeast to hydrocarbon-nonassimilating yeast to be mixed.

TABLE 1

| | | |
|---|---|---|
| Urea | gm | 5.0 |
| 75% phosphoric acid | ml | 2.7 |
| Potassium chloride | gm | 2.0 |
| Magnesium sulfate | gm | 2.0 |
| Zinc sulfate | gm | 0.03 |
| Ferrous sulfate | gm | 0.1 |
| Yeast extract | gm | 1.0 |
| Tap water | liter | 1 |
| pH | | 5.0 |

NOTE:
(1) n-Paraffin was added in an amount of 0.5 ml. per 30 milliliters of the above culture medium after sterilization.
(2) The hydrocarbon-nonassimilating yeast was inoculated after having been precultivated in a molt-extract preculture medium instead of n-paraffin medium and thoroughly washed with water.

The assimilating efficiency and the crude protein content of the resulting yeast cells can also be markedly increased by cultivating a mixed culture of hydrocarbon-assimilating yeast and hydrocarbon-non-assimilating yeast in the above-discussed manner. Although the exact mechanism which produced these highly surprising results is not completely understood, it is theorized that in the mixed culture of these two kinds of strains, the hydrocarbon-assimilating yeast oxidizes the petroleum hydrocarbon, such as n-paraffin to produce water-soluble metabolites, fatty acids, organic acids, vitamins, etc., and the hydrocarbon-non-assimilating yeast grows by utilization of these metabolites and vitamins (especially vitamin $B_1$). The nonassimilating strain in turn produces minor growth factor utilizable or absorbable by the assimilating strain. It is thought that they grow complementarily. There is hence a synergistic effect which yields the greatly increased protein content, the increased assimilation efficiency, and the increased cell productivity long sought by workers in the art.

A feature of the present invention is that strains having no ability to assimilate hydrocarbons grow utilizing metabolites produced by hydrocarbon-assimilating strains, resulting in both an improved assimilating efficiency and also a reduction of BOD (biochemical oxygen demand) and COD (chemical oxygen demand) in the waste liquor.

The raw material of the present invention, petroleum hydrocarbon, may be a straight chain aliphatic hydrocarbon (n-paraffin) having 930 carbon atoms per molecule or petroleum hydrocarbon which is rich in straight chain aliphatic hydrocarbons.

The culture medium used in the present invention may be an aqueous nutrient medium containing petroleum hydrocarbons, an inorganic or organic nitrogen source such as ammonia, ammonium sulfate, ammonium chloride or urea; a phosphoric acid source such as phosphoric acid, monopotassium phosphate or dipotassium phosphate; an inorganic salt such as a potassium, magnesium, iron or zinc salt, for example potassium chloride, magnesium sulfate, zinc sulfate, ferrous sulfate and ferric sulfate; and sometimes an organic salt such as iron citrate or ammonium acetate. Furthermore, corn steep liquor, yeast extracts or peptone may be added to the medium for the purpose of accelerating the growth of the yeasts. The cultivating conditions may be varied. The pH of the culture medium is preferably within the range of from 3.5 to 6.0. The cultivation may be performed at a temperature within the range of from 25° C. to 40° C., and preferably from 27° C. to 35° C. The concentration of petroleum hydrocarbons may range from about 0.01% to 1% of the total medium. The medium may be aerated in a known manner, such as use of a gas containing free oxygen pumped or bubbled or otherwise supplied into the culture medium during the cultivation. The pressure may be atmospheric or otherwise provided the culture is not destroyed. The time of cultivation may vary but should be sufficient to accomplish the desired results.

The mixing of the two kinds of strains may be effected at the initiation of the cultivation. Also, it is also possible to inoculate one of the strains during the course of the fermentation process. The mixing ratio, although varying according to the strains used and the cultivating conditions, may generally be varied as illustrated in the examples appearng below. Of course, the ratio cannot have zero (i.e., no quantity) on any or both sides.

The invention will further be explained by the following examples which are presented for illustrative purposes and not intended to limit the invention in any way.

EXAMPLE 1

A hydrocarbon-assimilating yeast *Candida arborea* and several hydrocarbon-nonassimilating yeast described in below Table 2 were cultivated in several respective mixed-cultures. Into a 500 ml. capacity flask was placed 30 ml. of the main cultivating medium described in above Table 1. Each test yeast group which was pre-cultivated in wort, was inoculated into the medium after washing with water, so as to make the cell concentration about $1 \times 10^5$ ml. The cultivation was conducted for 48 hours at 33° C. with shaking. The yield and crude protein content of yeast cells were measured. The results are shown in below Table 2.

TABLE 2

Co-cultivation of *Candida aborea* with hydrocarbon-nonassimilating yeasts

| Hydrocarbon-nonassimilating yeast | Cell yield (percent) | Crude protein content (percent) |
|---|---|---|
| None | 82.3 | 53.5 |
| Candida utilis | 99.5 | 55.5 |
| Torulopsis pseudaeria | 103.2 | 56.1 |
| Debaryomyces hansenii | 107.7 | 54.9 |
| Trigonopsis variabilis | 98.3 | 54.7 |

EXAMPLE 2

A hydrocarbon-nonassimilating yeast *Rhodotorula rubra* and several hydrocarbon-assimilating yeast shown in below Table 3 were cultivated in several respective mixed-cultures. The cultivating conditions were the same as in Example 1. The results are shown in below Table 3.

TABLE 3

Mixed culture of *Rhodotorula rubra* with hydrocarbon-assimilating yeasts

| Hydrocarbon-assimilating yeast | Single cultivation | | Mixed culture | |
|---|---|---|---|---|
|  | Cell yield percent | Crude protein content percent | Cell yield (percent) | Crude protein content (percent) |
| Candida tropicalis | 91.3 | 51.2 | 108.6 | 55.7 |
| Candida parapsilosis | 70.6 | 46.8 | 90.8 | 50.1 |
| Torulopsis magnoliae | 75.8 | 48.3 | 987.2 | 52.6 |
| Torulopsis xylinus | 69.1 | 50.5 | 85.8 | 55.5 |
| Zygosacharomyces tikymaensis | 88.2 | 49.7 | 106.5 | 51.2 |
| Zygosaccharomyces sake | 72.3 | 45.7 | 92.1 | 50.0 |
| Pichia miso | 81.6 | 41.1 | 101.3 | 48.3 |

EXAMPLE 3

A hydrocarbon-assimilating yeast *Candida guilliermondii* and a hydrocarbon-nonassimilating yeast *Trichosporon cutaneum* were cultivated in a mixed-culture under aerobic condition for 48 hours, in the culture medium shown in Table 1. The resulting preculture of the two strains were mixed at uniform count, weight, or volume ratios of 100:0, 90:10, 80:20, and 70:30, respectively. Each of the mixtures was inoculated, in an amount of 10% of the medium in 18 liters of a main culture medium of the same composition shown in Table 1. The main culture medium was charged into a 30-liter capacity jar fermenter. The inoculated mixture was subjected to batch cultivation, with stirring at 100 r.p.m., at 33° C. while aerating with a gas containing free oxygen at the rate of 30 liters per minute.

The hydrocarbon used in this example, consisted of n-paraffin having a specific gravity of 0.792/4° C., 99.7% by weight of n-paraffin, 0.025% by weight of an aromatic hydrocarbon. The cell yield and crude protein content of the yeast cells are shown in below Table 4.

TABLE 4

| Inoculation ratio | Cell yield (percent) | Crude protein content (percent) |
|---|---|---|
| 100:0 | 92.5 | 53.5 |
| 90:10 | 107.8 | 58.9 |
| 80:20 | 109.2 | 60.3 |
| 70:30 | 110.6 | 59.8 |

EXAMPLE 4

*Candida rugosa* and *Trichosporon pullulans*, used as seed cultures, were mixed at uniform count, weight or volumne ratios of 100:0, 70:30, and 30:70 respectively, and each of the mixture was inoculated into a main culture medium in the same manner as set forth in Example 1. The main cultivation was performed continuously, using a 30-liter jar fermenter containing 18 liters of the culture liquid, with stirring at 1000 r.p.m., at 33° C. while aerating with a gas containing oxygen at the rate of 20 liters per minute. At the end of 68 hours, the degree of assimilation and the crude protein content in the resulting cells were found to be as shown in Table 5 below.

TABLE 5

| Ratio of mixing seed cultures | Cell yield (percent) | Crude protein content (percent) |
|---|---|---|
| 100:0 | 94.9 | 54. |
| 70:30 | 109.6 | 59. |
| 30:70 | 114.3 | 60. |

It is understood that the foregoing is only illustrative of the principles of the invention and that numerous other changes and modifications would be obvious to the worker skilled in the art without departing from the spirit and scope of this invention.

We claim:

1. Process for producing yeast cells by cultivating a mixed culture of a hydrocarbon-assimilating yeast selected from the group consisting of *Torulopsis xylinus, Candida novellus, Candida tropicalis, Candida guilliermondii, Candida rugosa, Candida parapsilosis, Candida lipolytica, Pichia miso mogii* and *Zygosaccharomyces tikumaensis*; and a hydrocarbon nonassimilating yeast selected from the group consisting of *Trichosporon pullulans, Trichosporon cutaneum, Candida utilis, Rhodotorula rubra, Rhodotorula minuta, Toruloposis pseudaeria* and *Debaryomyces hansenii* in amounts effective to effectuate more efficient assimilation of petroleum hydrocarbons; in an aqueous medium comprising petroleum hydrocarbons selected from the group consisting of straight chain aliphatic hydrocarbons having 9 to 30 carbon atoms per molecule and petroleum hydrocarbons rich in such straight chain aliphatic hydrocarbons; and under aerobic conditions.

2. Process of claim 1, wherein said hydrocarbon assimilating yeast and said hydrocarbon-nonassimilating yeast and said hydrocarbon-nonassimilating yeast are mixed at the initiation of said cultivating.

3. Process according to claim 1 wherein either of said hydrocarbon-assimilating yeast or hydrocarbon-nonassimilating yeast is supplied during said cultivating.

4. Process of claim 1, wherein said petroleum hydrocarbon comprises n-paraffin, and wherein said hydrocarbon-assimilating yeast oxidizes said n-paraffin to produce at least metabolites and vitamins, and said hydrocarbon-nonassimilating yeast grows on said metabolites and vitamins and produces minor growth factors absorbable by said hydrocarbon assimilating yeast thereby reducing biochemical oxygen demand and chemical oxygen demand and increasing the assimilating efficiency of said process.

5. Process of claim 1, wherein said hydrocarbon-assimilating yeast and said hydrocarbon-nonassimilating yeast are in the ratio ranging from 90:10 to 10:90.

6. Process of claim 1, wherein said hydrocarbon-assimilating yeast and said hydrocarbon-nonassimilating yeast are in the ratio ranging from 80:20 to 20:80.

7. Process of claim 1, wherein said hydrocarbon-assimilating yeast and said hydrocarbon-nonassimilating yeast are in the ratio ranging from 70:30 to 30:70.

8. Process of claim 1, wherein said medium contains a source of nitrogen, a source of phosphoric acid, and salts of potassium, magnesium, zinc, iron or mixtures thereof; said medium being maintained at a pH of from 3.5 to 6.0, and at a temperature of from 25° C. to 40° C., while being aerated by a gas containing free oxygen, whereby said hydrocarbon-assimilating yeast oxidizes said petroleum hydrocarbon to produce at least metabolites and vitamins, and said hydrocarbon-nonassimilating yeast grows on said metabolites and vitamins and produces in turn minor growth factors useable by said hydrocarbon-assimilating yeast thereby to reduce biochemical demand and chemical oxygen demand and to increase assimilating efficiency of said process.

9. Process of claim 8, wherein said temperature is within the range of from 27° C. to 35° C., said salts comprise potassium chloride, magnesium sulfate, zinc sulfate, ferrous sulfate, or ferric sulfate, and wheerin said medium further comprises an accelerator selected from the group consisting of corn steep liquor, yeast extracts, peptone and mixtures thereof.

References Cited
UNITED STATES PATENTS

| 3,489,648 | 1/1970 | Wegner | 195—28 R |
| 3,655,510 | 4/1972 | Tanaka et al. | 195—28 R |

JOSEPH M. GOLIAN, Primary Examiner

U.S. Cl. X.R.

195—82, 111